Figure 1:
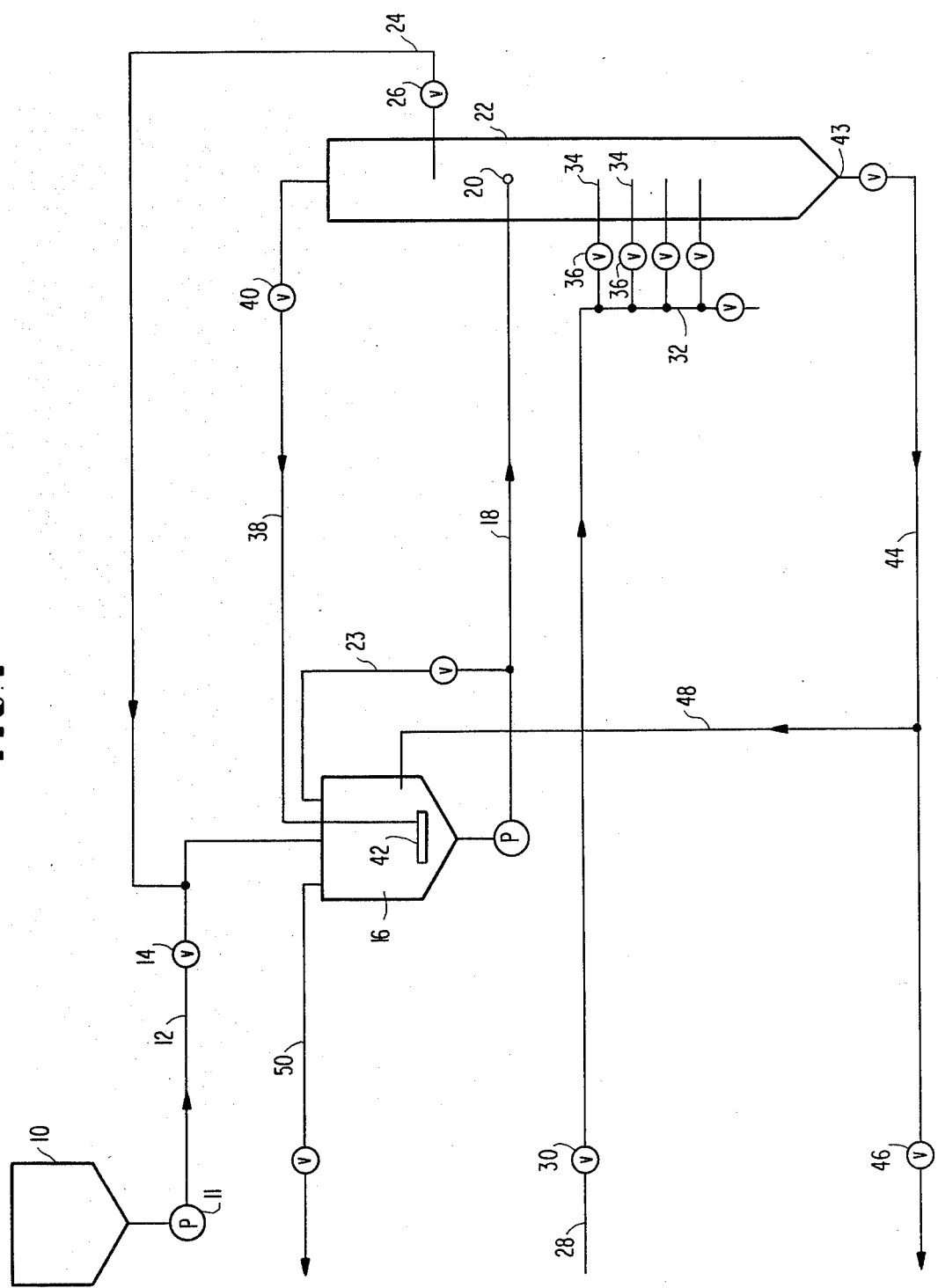

United States Patent [19]

Ransohoff

[11] 4,260,398
[45] Apr. 7, 1981

[54] COUNTERCURRENT SPARGER

[76] Inventor: Jackson A. Ransohoff, 5421 York Ln., Bethesda, Md. 20014

[21] Appl. No.: 856,553

[22] Filed: Dec. 1, 1977

[51] Int. Cl.³ .............................................. B01D 19/00
[52] U.S. Cl. ........................................... 55/41; 55/44; 55/48; 55/51; 55/53
[58] Field of Search .................... 55/41, 44, 48, 52, 53, 55/191, 204, 235–238, 205, 51; 261/79 A; 526/77, 93

[56] References Cited
U.S. PATENT DOCUMENTS

| 2,807,450 | 9/1957 | Gordon | 261/79 A |
| 3,722,185 | 5/1973 | Miczek | 261/79 A X |
| 4,020,256 | 4/1977 | Zweigle et al. | 526/88 |
| 4,054,429 | 10/1977 | Ostojic et al. | 55/48 |

FOREIGN PATENT DOCUMENTS 511291 6/1976 U.S.S.R. ..................................... 55/204

Primary Examiner—Robert H. Spitzer
Attorney, Agent, or Firm—Sughrue, Rothwell, Mion, Zinn and Macpeak

[57] ABSTRACT

The disclosure describes process and apparatus for removing dissolved oxgyen from a liquid wherein the liquid is countercurrently contacted by a sparging gas as the two flow circumferentially through a cylindrical column. The invention applies generally to the achievement of efficient mass transfer between two immiscible fluids of substantially differing density, and is particularly useful as a preparatory step in polymerization processes where a liquid monomer is shipped or stored in an air inhibited condition and the oxygen dissolved must be removed prior to polymerization.

30 Claims, 1 Drawing Figure

COUNTERCURRENT SPARGER

BACKGROUND OF THE INVENTION

1. Field of the Invention

The present invention relates generally to mass transfer between immiscible fluids to the absorption and desorption of gases in liquids, and specifically to sparging dissolved gas from a monomer containing liquid. More particularly, the present invention relates to the continuous removal of dissolved oxygen from a monomer solution by agitating the liquid with a countercurrent flow of compressed nitrogen. The invention has specific application in the field of industrial polymerization.

2. Background Discussion

Frequently, liquid monomer solutions which are polymerized on an industrial scale are saturated with air for storage and shipping in order to prevent the monomer from polymerizing prematurely. The oxygen present in such air saturated monomer solutions plays a critical role in preventing premature polymerization from occurring; and accordingly, said oxygen must be substantially removed from the solution before a well controlled polymerization reaction can be accomplished.

In the prior art, oxygen is frequently removed from monomer solutions by a sparging operation wherein the liquid monomer solution is agitated by the passage of compressed nitrogen. In batch operation, prior art sparging is generally accomplished by placing the liquid monomer solution in a large tank where it is contacted with compressed nitrogen entering the tank through a diffuser located in the bottom of the tank. There is an inherent inefficiency in batch sparging due to the mixing of sparged and unsparged liquid.

In continuous prior art sparging, nitrogen flows into the bottom of a gas-liquid contactor such as a packed column or a bubble plate column and upward through downflowing monomer solution which is continuously admitted at the top of the column. This method has the disadvantage that the column is potentially subject to fouling due to the gradual buildup of polymer in the completely sparged regions of the column. The present invention provides a means of efficiently and countercurrently contacting the aforementioned sparging gas with the aforementioned monomer solution under circumstances where no structural components are required for effective dispersal.

SUMMARY OF THE INVENTION

In a broad sense, the present invention may be used to enhance mass transfer between any immiscible fluids of different density. However, the specific problem which led to the present invention was that of reducing the oxygen content of an air saturated acqueous solution of a vinyl monomer, from about five parts per million to less than 25 parts per billion; and the invention can be best described in the context of providing for the continuous sparging of oxygen saturated monomer solution to provide a charge suitable for radiation initiated polymerization.

In accordance with the present invention, a circumferential flow of liquid monomer solution is contacted in a column, hereinafter called a "centrifugal contactor," with a circumferential flow (in the same direction) of compressed gas at high velocity. Upon contact with the liquid, the gas velocity is rapidly reduced, and countercurrent flow of the two fluids is established radially by centrifugal forces, and axially by gravitational forces. In accordance with the simplest application of the present invention, a supply of solution to be sparged is continuously introduced to the column, and a supply of sparged liquid is continuously removed for use in subsequent processing as desired.

In accordance with one embodiment of the present invention, the countercurrent centrifugal contactor is coupled with a conventional batch process sparge tank to effect the continuous sparging of air inhibited monomer solution. Partially sparged liquid is fed from a conventional batch process sparge tank to a cylindrical column where said partially sparged liquid enters the column tangentially at a point intermediate between the top and bottom of the column. The liquid moves down the column in circumferential flow and contacts a circumferential flow of compressed nitrogen gas which tangentially enters the column at locations between the liquid inlet and the bottom of the column. The sparging gas and liquid enter the column in the same rotational direction; however, due to the centrifugal and gravitational separative forces resulting from the different densities of the two fluids, the sparging gas flows toward the center and top of the column while the more dense liquid flows to the outside and bottom of the column. This countercurrent flow produces surprisingly effective contact of the two fluids and relatively little by passing of unsparged liquid with the result that a single pass of liquid through a relatively short column yields a continuous flow of adequately sparged liquid. The gas exiting the top of the centrifugal contactor proceeds through a diffuser located in the bottom of the intermediate sparge tank as in conventional sparging, and air saturated liquid fed to the intermediate sparge tank is partially sparged thereby to produce a partially sparged feed for the centrifugal contactor.

The efficiency of the operation and the stability of the process are enhanced if a portion of the liquid entering the centrifugal contactor is withdrawn from a location between the point of liquid entry to the column and the top of the column, and returned along with some of the sparge gas to the intermediate sparge tank. At a constant feed to the centrifugal contactor, the two phase flow through the return line adjusts to a wide range of product removal rates, and effectuates operation stable over a range wherein the ratio of product removal to feed rate may vary from 0.2 to 0.8 for example. In order to enable product removal to be stopped completely it is desirable to return some flow of product to the intermediate sparge tank to minimize the chance of inadvertent polymerization in the column.

While the instant specification is directed to teaching the use of the present invention to remove gaseous inhibitor from liquid monomer solutions preparatory to use in a polymerization process, it is clearly apparent that the teachings of the present invention are also applicable to other situations where one desires the efficient countercurrent contact of immiscible fluids of substantially different density. The working of the present invention will become more apparent on consideration of the drawing where:

SHORT DESCRIPTION OF THE DRAWING

FIG. 1 is a schematic of a preferred embodiment of the process and apparatus of the present invention.

DESCRIPTION OF WORKING EMBODIMENT

Referring to FIG. 1, the numeral 10 designates a storage tank containing a liquid monomer solution saturated with air. Said air saturated solution is pumped (11) from the tank 10 to an intermediate sparge tank 16 through a pipeline or conduit, 12, which is equipped with a manually or automatically operated control valve, 14, whereby the level of liquid in the intermediate tank, 16, may be maintained within predetermined limits. Partially sparged liquid is pumped from the intermediate tank, 16, via line 18 to the inlet port, 20, on the centrifugal contactor where it tangentially enters the cylindrical column 22. A bypass line 23 controls flow to the column 22 by permitting a portion of the liquid pumped out of the intermediate sparge tank, 16, to be returned directly to the tank.

Of the liquid which enters the column, a variable portion, hereinafter called overflow, flows upward and out of the column, together and concurrent with a portion of the sparging gas via line 24 equipped with control valve 26, as will be discussed below. The balance of the material flows downward through the column into intimate and countercurrent contact with the sparging gas.

Sparging is accomplished by a countercurrent flow of pressurized gas. In FIG. 1, the sparging gas is transported to the column via line 28 and control valve 30. The sparging gas enters the column through a manifold 32 of inlet port lines 34, each of which may be equipped with a control valve 36. The sparging gas enters the column tangentially flowing in the same rotational direction as the liquid to be sparged. Accordingly, "countercurrent" as it is used in this specification does not refer to the angular or rotational direction in which the sparging gas and liquid flow through the column. The countercurrent flow is a product of the centrifugal forces set up in the column as a result of the rotation of the sparging gas and liquid therein and the differences in the densities of the fluids. Since the centrifugal force on the heavier liquid is greater than on the lighter gas, the liquid moves to the outside or perimeter of the column and downwardly as the sparging gas moves from its point of entry on the perimeter of the column to the center and upwardly. Accordingly, the sparging gas moves radially inward through the liquid as they pass through the column, producing considerable turbulence and enhancing the efficient transfer of dissolved oxygen from the liquid to the sparging gas.

To complete the circulation of material in FIG. 1, the major portion of the sparging gas flows out of the column through line 38 via valve 40, whereby it is returned to the intermediate sparge tank 16 through a diffuser 42. After flowing through the solution in tank 16, the sparging gas flows through line 50 for recycle or subsequent release after scrubbing as necessary to remove any monomer vapors. The balance of the sparging gas flows in two-phase flow with the previously referenced partially sparged overflow back to the intermediate sparge tank through line 23. The sparged product is removed from the bottom of the tank via outlet 43, removal line 44 and control valve 46 for use or subsequent processing as desired. To minimize the chance of sparged fluid hideout within the system, it is good practice to return a portion of the sparged product continuously to the intermediate sparge tank through return line 48 as shown.

In operation, inlet valves and flow rates are generally fixed. Short term variations in product removal rate from full on to full off are accommodated without instability within the system. The ability to accomodate long term changes in product removal are, of course, limited by the surge volume in the intermediate sparge tank.

In the design of the centrifugal contactor, the principle consideration is that there be good circumferential flow of the sparging gas and liquid through the column. Generally, the sparging gas and liquid enter the column under pressure with the exact pressures determined by other system considerations. A linear tangantial flow rate of a few feet per second at the liquid entry is adequate to establish sufficient circumferential flow. The flow rate of gas should be at a velocity appreciably higher than that of the liquid, and inlet nitrogen velocities near sonic have been found to give effective results.

In a specific working embodiment presently in operation, the centrifugal contactor column is a 12 inch diameter pipe, approximately 6 feet long, with a conical bottom. In this embodiment, liquid monomer is introduced to the column at a point 2 feet from the top of the column at an inlet velocity of about three feet per second. The sparging gas (nitrogen) enters the column at about sonic velocity through a manifold of four inlet ports at distances 12", 21", 30" and 39" below the liquid inlet port. In accordance with this working embodiment, it is possible to continuously sparge about 80 liters/minute of oxygen saturated monomer solution to a concentration of less than 25 parts per billion oxygen. The air saturated feed to the intermediate sparge tank contains about 5 parts per million of oxygen, and the oxygen content of the intermediate sparge tank is on the order of a few hundred parts per billion. While in the preferred embodiment, the centrifugal contactor column is used in combination with an intermediate sparge tank, it will be apparent that in some operations satisfactory results may be obtained by passing the liquid to be sparged directly through the centrifugal contactor. The intermediate sparge tank, however, lends greater flexibility to the system and provides for more efficient use of sparge gas.

Generally, the sparging gas will be a gas which is inert and insoluble in the liquid to be sparged, non-toxic, easily handled and inexpensive. In stripping air inhibited monomer, nitrogen is preferable.

Having described the invention in detail, it will be apparent to the skilled artisan that many variations and modifications thereof are possible without departing from the spirit and scope of the following claims.

I claim:

1. A continuous process for removing a dissolved substance from a liquid which comprises:
    (a) tangentially flowing said substance containing liquid into a vertically positioned cylindrical column such that said liquid circumferentially flows within and down said column;
    (b) concurrently introducing to said column at one or more points below the point at which said liquid enters said column, a fluid which is less dense than said liquid and substantially insoluble in said liquid, said fluid entering said column tangentially at a velocity substantially higher than the velocity of said liquid so that said fluid flows around the axis of said column in the same rotational direction as said liquid;

(c) concurrently withdrawing said fluid from the top of said column, and withdrawing said liquid from the bottom of said column.

2. The process of claim 1 further comprising the steps of:
(d) withdrawing a mixture of said fluid and said liquid from a point in said column between said liquid entry and said fluid outlet;
(e) separating said fluid from said liquid in a second vessel, and
(f) reintroducing said liquid to said column.

3. The process of claim 2 wherein the fluid removed from the top of said column subsequently flows to a second vessel wherein it is dispersed through the liquid feed for said column.

4. The process of claim 3 wherein said dissolved substance is more soluble in said fluid than in said liquid.

5. The process of claim 4 wherein said dissolved substance is oxygen and said fluid is nitrogen.

6. The process of claim 3 wherein said liquid comprises a polymerizable monomer and water.

7. The process of claim 3 wherein the velocity of said entering fluid is such that the centrifugal force of said entering fluid at the point of entry of the column is higher than the centrifugal force of said rotating liquid at the periphery of said column.

8. The process of claim 2 wherein a portion of the liquid removed from the bottom of said column is recirculated to said second vessel.

9. The process of claim 8 wherein said dissolved substance is more soluble in said fluid than in said liquid.

10. The process of claim 9 wherein said dissolved substance is oxygen and said fluid is nitrogen.

11. The process of claim 8 wherein said liquid comprises a polymerizable monomer and water.

12. The process of claim 8 wherein the velocity of said entering fluid is such that the centrifugal force of said entering fluid at the point of entry of the column is higher than the centrifugal force of said rotating liquid at the periphery of said column.

13. The process of claim 2 wherein said dissolved substance is more soluble in said fluid than in said liquid.

14. The process of claim 13 wherein said dissolved substance is oxygen and said fluid is nitrogen.

15. The process of claim 2 wherein said liquid comprises a polymerizable monomer and water.

16. The process of claim 2 wherein the velocity of said entering fluid is such that the centrifugal force of said entering fluid at the point of entry to the column is higher than the centrifugal force of said rotating liquid at the periphery of said column.

17. The process of claim 1 wherein the fluid removed from the top of said column subsequently flows to a second vessel wherein it is dispersed through the liquid feed for said column.

18. The process of claim 17 wherein a portion of the liquid removed from the bottom of said column is recirculated to said second vessel.

19. The process of claim 18 wherein said dissolved substance is more soluble in said fluid than in said liquid.

20. The process of claim 19 wherein said dissolved substance is oxygen and said fluid is nitrogen.

21. The process of claim 18 wherein said liquid comprises a polymerizable monomer and water.

22. The process of claim 18 wherein the velocity of said entering fluid is such that the centrifugal force of said entering fluid at the point of entry of the column is higher than the centrifugal force of said rotating liquid at the periphery of said column.

23. The process of claim 17 wherein said dissolved substance is more soluble in said fluid than in said liquid.

24. The process of claim 23 wherein said dissolved substance is oxygen and said fluid is nitrogen.

25. The process of claim 17 wherein said liquid comprises a polymerizable monomer and water.

26. The process of claim 17 wherein the velocity of said entering fluid is such that the centrifugal force of said entering fluid at the point of entry to the column is higher than the centrifugal force of said rotating liquid at the periphery of said column.

27. The process of claim 1 wherein said dissolved substance is more soluble in said fluid than in said liquid.

28. The process of claim 27 wherein said dissolved substance is oxygen and said fluid is nitrogen.

29. The process of claim 1 wherein said liquid comprises a polymerizable monomer and water.

30. The process of claim 1 wherein the velocity of said entering fluid is such that the centrifugal force of said entering fluid at the point of entry to the column is higher than the centrifugal force of said rotating liquid at the periphery of said column.

* * * * *